United States Patent
Shimokawa

(10) Patent No.: US 8,065,449 B2
(45) Date of Patent: Nov. 22, 2011

(54) DMA DEVICE HAVING PLURAL BUFFERS STORING TRANSFER REQUEST INFORMATION AND DMA TRANSFER METHOD

(75) Inventor: Hiroki Shimokawa, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 289 days.

(21) Appl. No.: 12/461,432

(22) Filed: Aug. 11, 2009

(65) Prior Publication Data

US 2010/0064071 A1    Mar. 11, 2010

(30) Foreign Application Priority Data

Sep. 8, 2008   (JP) ................. 2008-229600

(51) Int. Cl.
*G06F 13/28* (2006.01)
*G06F 3/00* (2006.01)

(52) U.S. Cl. ................. 710/22; 710/36; 710/40; 710/52

(58) Field of Classification Search .................. None
See application file for complete search history.

(56) References Cited

U.S. PATENT DOCUMENTS 6,557,052 B1 *   4/2003  Kubo ............................ 710/23
2006/0080478 A1 *   4/2006  Seigneret et al. ............... 710/22

FOREIGN PATENT DOCUMENTS

JP       2000-99452 A      4/2000

* cited by examiner

*Primary Examiner* — Alan Chen
(74) *Attorney, Agent, or Firm* — McGinn IP Law Group, PLLC

(57) ABSTRACT

A Direct Memory Access (DMA) device includes a first buffer which holds a first transfer information required for a first transfer request, and a second buffer which holds a second transfer information required for a second transfer request, and a transfer request comparison circuit which determines whether or not a current transfer request, which is newly inputted, matches with the first transfer request or the second transfer request. The DMA device includes a priority determination circuit that, in case where the transfer request comparison circuit determines that the current transfer request is not matched with the first transfer request or the second transfer request, updates the second transfer information to a transfer information for the current transfer request when a priority of the current transfer request is higher than a priority of the second transfer request, and updates the first transfer information to the transfer information for the current transfer request when the priority of the current transfer request is lower than the priority of the second transfer request.

16 Claims, 12 Drawing Sheets

FIG. 3
OCCURRENCE OF REQUEST
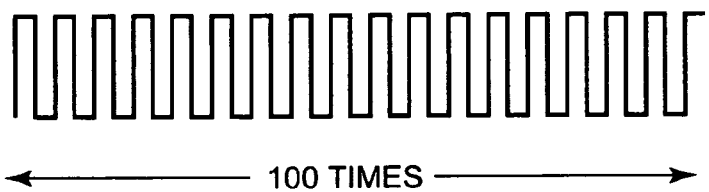
← 100 TIMES →
ACTIVATED DMA TRANSFER
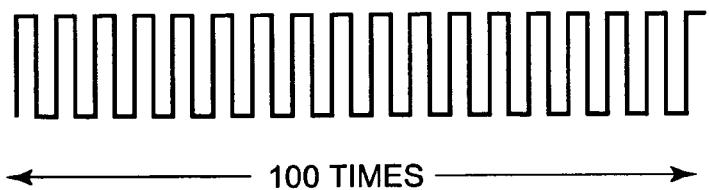
← 100 TIMES →
NUMBER OF TIMES OF DMA TRANSFER FOR ONE TIME OF TRANSFER REQUEST IS SMALL
FIG. 4
OCCURRENCE OF REQUEST
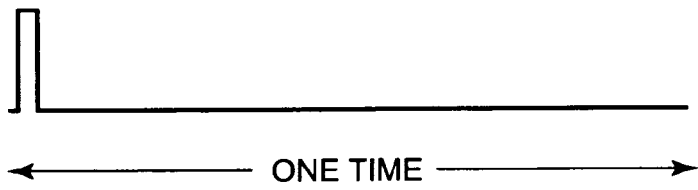
← ONE TIME →
ACTIVATED DMA TRANSFER
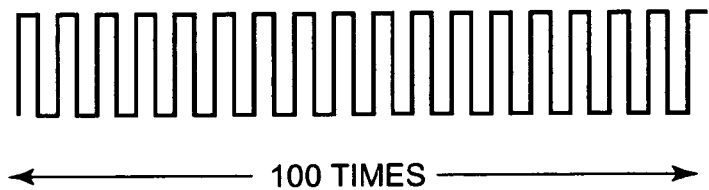
← 100 TIMES →
NUMBER OF TIMES OF DMA TRANSFER FOR ONE TIME OF TRANSFER REQUEST IS LARGE

DMA DEVICE HAVING PLURAL BUFFERS STORING TRANSFER REQUEST INFORMATION AND DMA TRANSFER METHOD

INCORPORATION BY REFERENCE

This application is based upon and claims the benefit of priority from Japanese Patent Application No. 2008-229600 which was filed on Sep. 8, 2008, the disclosure of which is incorporated herein in its entirety by reference.

BACKGROUND OF THE INVENTION

1. Field of the Invention

The present invention relates to microcomputers (hereafter, referred to as "micros") and in particular to a DMA (Direct Memory Access) device and a DMA transfer method incorporated in a micro.

2. Description of Related Art

With the aim of reducing load on CPU (Central Processor Unit) associated with increase in the number of peripheral I/Os (Input/Output Ports) incorporated in micros, there is demand for multichannel DMA. In general, a DMA device incorporates transfer information equivalent to the number of channels in DMA. Therefore, when the number of channels is increased, the amount of incorporated transfer information is increased and this leads to the expanded physical scale of the DMA.

As one means for avoiding the expansion of physical scale due to channel multiplication, there is a technique in which transfer information is placed in rewritable memory, such as RAM (Random Access Memory). At each time of transfer the transfer information is read from the RAM and the read information is placed in the DMA device to carry out DMA transfer.

In DMA of such a type that transfer information placed in RAM is read, the expansion of physical scale due to channel multiplication can be avoided. However, overhead due to reading of transfer information from RAM at each time of transfer is produced and this poses a problem of degradation in transfer performance.

In recent years, re-specification of data paths have been frequently carried out to cope with increase in micro clock frequency and this tends to increase clock counts in transfer. Because of bus multiplication in conjunction with diversification of peripheral I/Os and the complication of systems, it has been required to displace the access path from DMA to RAM to a different bus and overhead tends to further increase. For this reason, it is demanded to reduce overhead arising from reading of transfer information.

Description will be given to the configuration of a device disclosed in Patent Document (Japanese Patent Application Laid Open No. 2000-99452) with reference to FIG. 9, FIG. 10, and FIG. 11. As illustrated in FIG. 9, this device is comprised of: a first buffer including a DMA count register 91, a DMA command register 92, a DMA address register 93, a DMA offset register 94, and a request number register 81; a data bus 95 for carrying out data transfer; a transfer request signal 84; a request number 82 corresponding to the request signal 84; a request number comparator 83, and a DMA control circuit 99. This device is DMA of such a type that transfer information placed in RAM is read.

FIG. 10 illustrates an example of transfer information placed in RAM. One piece of transfer information is composed of transfer information TIA, TIB, TIC equivalent to 3 words. FIG. 11 illustrates an example of multiple pieces of transfer information placed in RAM. Transfer information items to be read are displaced in positions predetermined by a user program in the RAM like transfer information TIA000, TIB000, . . . .

Description will be given to the operation of the thus configured device. A transfer request is made by the transfer request signal 84. The request number corresponding to a transfer request signal 84 is given starting from the request number 82. At this time, at the request number comparator 83, the request number 82 is compared with a value stored in the request number register 81. Initially, the request number register 81 is empty and the result of comparison at the request number comparator 83 is disagreement. When the result of comparison is disagreement, the request number 82 is stored in the request number register 81 and transfer information corresponding to the request number 82 is read from the RAM.

First, transfer information TIA is read from the RAM and placed in the DMA count register 91 and the DMA command register 92. Subsequently, transfer information TIB and transfer information TIC are sequentially read from the DMA and placed in the DMA address register 93. Then DMA transfer is carried out.

When a transfer request whose request number is the same as the previous request number occurs, the request number 82 and a value stored in the request number register 81 are compared with each other at the request number comparator 83. Since the request number of the transfer request of this time is the same as the previous request number, the result of comparison is agreement. Therefore, reading of transfer information TIA, TIB, TIC is skipped and DMA transfer is immediately carried out.

When a transfer request whose request number is different from the previous request number occurs, the request number 82 and a value stored in the request number register 81 are compared with each other at the request number comparator 83. Since the request number of the transfer request of this time is different from the previous request number, the result of comparison is disagreement. Consequently, transfer information TIA, TIB, TIC are written back and saved to the RAM area corresponding to the previous request number because the transfer information TIA, TIB, TIC corresponding to the previous request number remain in the DMA device. Thereafter, the transfer information TIA, TIB, TIC corresponding to the request number 82 of this time are read and DMA transfer is carried out.

In the related art, as mentioned above, the request number comparator 83 determines whether or not to skip reading of transfer information according to whether or not the previous request number and the request number of this time are matched with each other.

FIG. 12 is a timing chart of an example where request numbers are matched with each other, illustrating how the effect of the related art is exerted. During period T0, first, request number 02 is inputted together with a transfer request. In response thereto, in the DMA device, request number 02 is set in the request number register 81 and transfer information TIA, TIB, TIC corresponding to request number 02 are read during period T02R. Thereafter, DMA transfer is carried out during period TDMA. When a request with request number 02, identical with the previous request number, occurs during period T1, the following processing is carried out: since the value in the request number register 81 and the request number in period T1 are identical with each other, reading of the transfer information TIA, TIB, TIC is skipped and the cycle in period TDMA is immediately carried out.

FIG. 13 illustrates an example where the previous request number and the request number are not matched with each other. In the related art, the following processing is carried out when a transfer request with request number 00 occurs during period T0: during period T00R, transfer information TIA, TIB, TIC corresponding to request number 00 are read and during period TDMA, DMA transfer is carried out. When a transfer request with request number 01 thereafter occurs during period T1, transfer information TIA, TIB, TIC corresponding to request number 00 is written back and saved during period T00W because request number 01 is different from the previous request number 00. During period T01R, transfer information items TIA, TIB, and TIC corresponding to request number 01 are read, and DMA transfer is carried out based on these items of transfer information.

SUMMARY

In the related art, as illustrated in FIG. 13, period T00W and period T01R occur without exception when a transfer request whose request number is different from that of the previous transfer request occurs. In the related art, for this reason, time for rewriting becomes overhead and this poses a problem of degradation in response performance.

A Direct Memory Access (DMA) device includes a first buffer which holds a first transfer information required for a first transfer request, a second buffer which holds a second transfer information required for a second transfer request, and a transfer request comparison circuit which determines whether or not a current transfer request, which is newly inputted, matches with the first transfer request or the second transfer request. The DMA device further includes a priority determination circuit that, in case where the transfer request comparison circuit determines that the current transfer request is not matched with the first transfer request or the second transfer request, updates the second transfer information to a transfer information for the current transfer request when a priority of the current transfer request is higher than a priority of the second transfer request, and updates the first transfer information to the transfer information for the current transfer request when the priority of the current transfer request is lower than the priority of the second transfer request. The DMA device further includes a DMA transfer control circuit which carries out a DMA transfer using the transfer information held in the first buffer or the second buffer updated by the priority determination circuit.

As mentioned above, first and second buffers for holding transfer information are provided and transfer information held in the second buffer is updated based on the priority level of transfer information. As a result, transfer information of a higher priority level is continuously held in the second buffer. For this reason, the following can be implemented by, for example, setting a higher priority level for transfer information higher in transfer frequency: the preferential information is held in the second buffer and thus it is possible to reduce overhead produced when this transfer request occurs. This makes it possible to enhance the response performance of the DMA device.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 3 illustrates a timing chart indicating single transfer in a DMA device;

FIG. 4 illustrates a timing chart indicating block transfer in a DMA device;

DETAILED DESCRIPTION OF THE EXEMPLARY EMBODIMENTS

First Exemplary Embodiment

Figure 1:
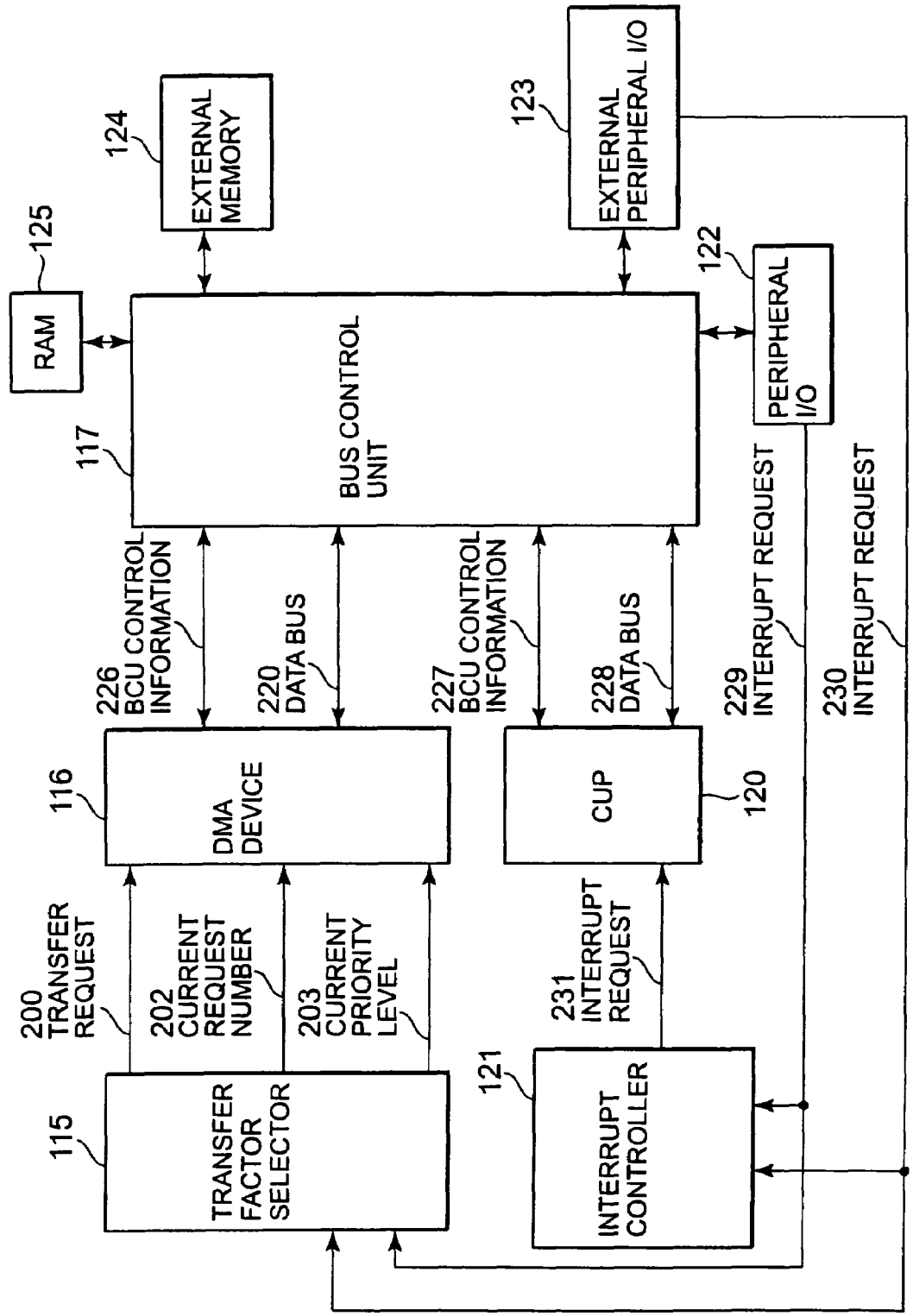
FIG. 1 is a block diagram illustrating a host system including a DMA device in a first exemplary embodiment of the invention.

FIG. 1 is a block diagram illustrating an example of the configuration of a host system including a DMA device in a first exemplary embodiment of the invention. This host system includes CPU (Central Processor Unit) 120, an interrupt controller 121, a transfer factor selector 115, a DMA (Direct Memory Access) device 116, and a bus control unit 117.

The CPU 120 executes various programs stored in RAM (Random Access Memory) 125. The CPU 120 is connected to the bus control unit 117 through a data bus 228. The CPU 120 uses BCU (Bus Control Unit) control information 227 and the data bus 228 and invokes and writes programs and data stored in the RAM 125 or an external memory 124.

The interrupt controller 121 temporarily stops a program running on the CPU 120 in accordance with interrupt requests 229, 230 inputted from a peripheral I/O (Input/Output) 122 or an external peripheral I/O 123.

The transfer factor selector 115 is inputted with interrupt request 229 outputted from the peripheral I/O 122 and interrupt request 230 outputted from the external peripheral I/O 123 and selects one transfer request according to preprogrammed priorities. The transfer factor selector 115 then makes the selected transfer request to the DMA device 116. The transfer factor selector 115 outputs the request number 202 of the selected transfer request 200 and a current priority level 203 preset for this transfer request by a user to the DMA device 116. A higher priority level is set for, for example, transfer requests higher in transfer frequency.

The DMA device 116 is connected to the bus control unit 117 through a data bus 220. The DMA device 116 is inputted with the transfer request 200, the current priority level 203, and the current priority level 203 from the transfer factor selector 115 and inputs and outputs BCU control information 226 from and to the bus control unit 117.

The bus control unit 117 uses the BCU control information 226, data bus 220, BCU control information 227, and data bus 228 and inputs and outputs data between it and the peripheral I/O 122, external peripheral I/O 123, external memory 124, and RAM 125.

Description will be given to the operation at the level of the thus configured host system. The transfer factor selector 115 is inputted with the interrupt request 229 outputted from the peripheral I/O 122 and the interrupt request 230 outputted from the external peripheral I/O 123. Then it selects one transfer request according to the preprogrammed priorities and makes a transfer request by the transfer request 200. At this time, it outputs the current request number 202 and the current priority level 203 corresponding to the selected transfer request.

The DMA device 116 is inputted with the current request number 202, current priority level 203, and transfer request 200 and reads transfer information corresponding to the current request number 202 from the RAM 125. Then the DMA device 116, in accordance with the transfer information read from the RAM 125, uses the BCU control information 226 and the data bus 220 and carries out DMA transfer between it and the peripheral I/O 122, external peripheral I/O 123, external memory 124, and RAM 125.

Figure 2:
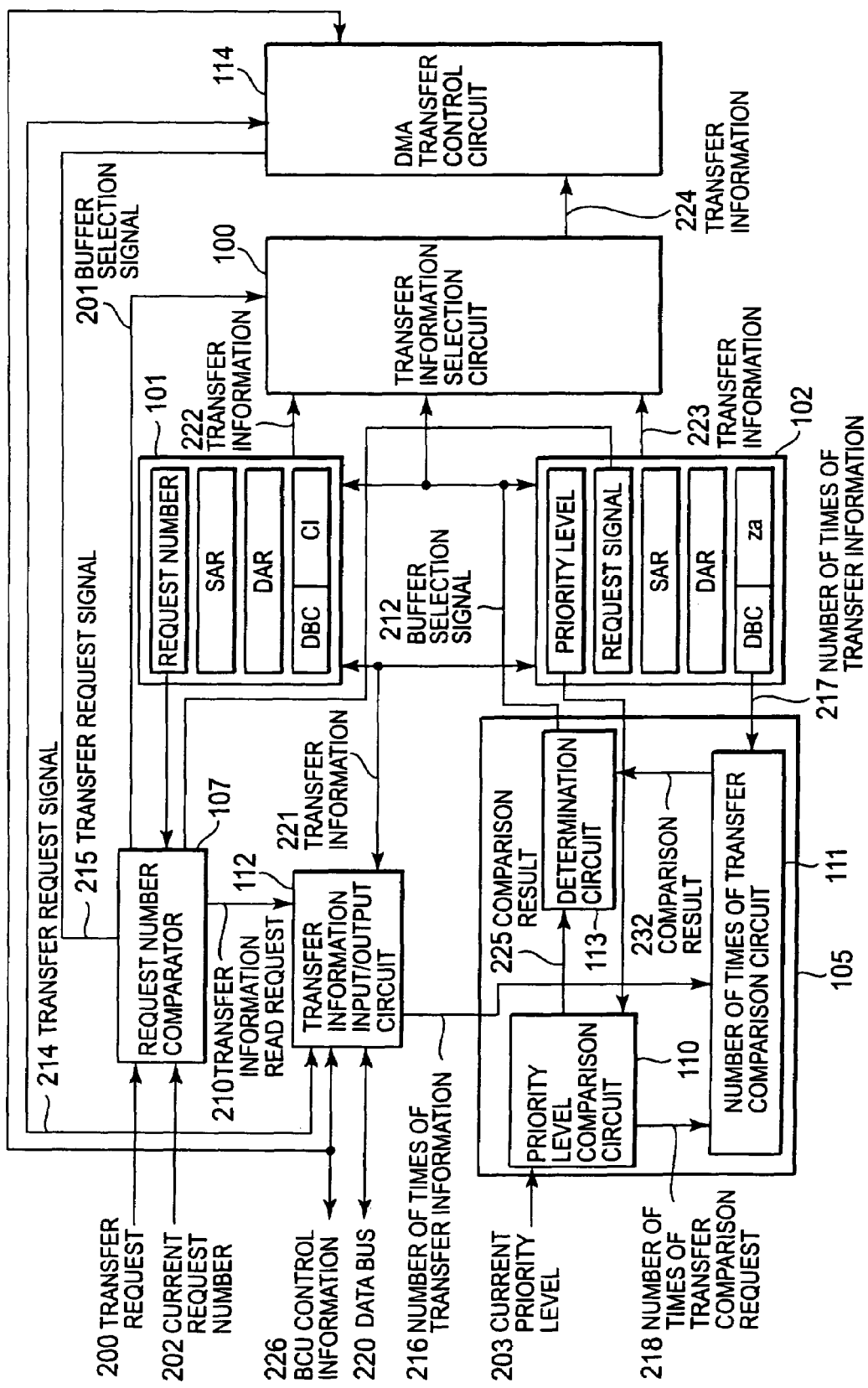
FIG. 2 is a block diagram illustrating an example of the configuration of a DMA device in the first exemplary embodiment of the invention.

FIG. 2 is a block diagram illustrating an example of the configuration of the DMA device. The DMA device 116 includes: a request number comparator 107, a transfer information input/output circuit 112, a priority control circuit 105, a first buffer 101 and a second buffer 102, a transfer information selection circuit 100, and a DMA transfer control circuit 114.

The priority control circuit 105 includes a priority level comparison circuit 110, a number of times of transfer comparison circuit 111, and a determination circuit 113. The priority circuit 105 holds a transfer request of a higher priority in the second buffer 102. Specifically, when the priority of a newly inputted transfer request is higher than the priority of a transfer request stored in the second buffer 102, the priority control circuit 105 selects the second buffer 102. As a result, transfer information corresponding to the newly selected transfer request is stored in the second buffer 102 through the transfer information input/output circuit 112.

Meanwhile, when the priority of a newly inputted transfer request is lower than that of a transfer request stored in the second buffer 102, the priority control circuit 105 selects the first buffer 101. As a result, transfer information corresponding to the newly selected transfer request is stored in the first buffer 101 through the transfer information input/output circuit 112. In the initial state before the occurrence of a transfer request, both the first buffer 101 and the second buffer 102 are empty. Therefore, the priority control circuit 105 selects the second buffer 102. In the initial state, as a result, a transfer request that newly occurs is stored in the second buffer 102.

In the first buffer 101, a request number, a source address register SAR, a destination address register DAR, a number of times of transfer register DBC, and control information CI are stored. In the second buffer 102, a priority level request number, a source address register SAR, a destination address register DAR, a number of times of transfer register DBC, and control information CI are stored.

The request number comparator 107 is inputted with the transfer request 200 and the current request number 202 from the transfer factor selector 115. The request number comparator 107 compares the inputted current request number 202 with the request numbers stored in the first buffer 101 and the second buffer 102. Then it outputs a transfer request signal 215, a buffer selection signal 201, and a transfer information read request 210 according to the result of the comparison.

The transfer request signal 215 is a signal that requests DMA transfer of the DMA transfer control circuit 114. The transfer information read request 210 is a signal that requests the transfer information input/output circuit 112 to retrieve transfer information from the RAM 125. The buffer selection signal 201 is a signal that instructs the transfer information selection circuit 100 to select either the first buffer 101 or the second buffer 102.

The transfer information input/output circuit 112 is inputted with the transfer information read request 210 and outputs number of times of transfer information 216 and a transfer request signal 214. Further, the transfer information input/output circuit 112 uses the BCU control information 226 and the data bus 220 and inputs and outputs transfer information 221 between it and the first buffer 101 and the second buffer 102.

The priority level comparison circuit 110 is inputted with the current priority level 203 and the priority level stored in the second buffer 102 and outputs comparison result 225 according to the result of the comparison. When the current priority level 203 and the priority level stored in the second buffer 102 are equal to each other, the priority level comparison circuit 110 outputs a number of times of transfer comparison request 218 to the number of times of transfer comparison circuit 111.

When the number of times of transfer comparison circuit 111 receives the number of times of transfer comparison request 218, the circuit 111 receives the number of times of transfer information 216 of the transfer request newly inputted through the transfer information input/output circuit 112, and the number of times of transfer information 217 from the second buffer 102. The circuit 111 compares the number of times of DMA transfer set for one time of transfer request in the newly inputted transfer request and the number of times of DMA transfer set for one time of transfer request stored in the second buffer 102. The number of times of transfer comparison circuit 111 outputs the obtained comparison result 232 to the determination circuit 113.

FIG. 3 is a timing chart indicating a transfer pattern generally designated as single transfer. In a single transfer, one DMA transfer is caused by one DMA request. FIG. 3 illustrates how 100 DMA transfers are carried out by 100 DMA requests.

When this single transfer is carried out in the first buffer 101, a series of operations of reading of transfer information TIA, TIB, TIC, DMA transfer, and writing-back of transfer information TIA, TIB, TIC is performed 100 times. Therefore, reading and writing-back of transfer information TIA, TIB, TIC occur 100 times.

FIG. 4 is a timing chart indicating a transfer pattern generally designated as block transfer. In block transfer, a specified number of times of transfer are carried out by one time of DMA request. FIG. 4 illustrates how 100 times of DMA transfer are carried out by one time of DMA request. When block transfer is carried out in the first buffer 101, transfer information TIA, TIB, TIC are read only once at the beginning, DMA transfer is carried out 100 times, and then transfer information TIA, TIB, TIC are written back only once at the end.

The single transfer and the block transfer are further repeatedly carried out a preset number of times. In case the number of times of repetition of transfer request in the single transfer illustrated in FIG. 3 is, for example, 5, DMA transfer is carried out 5 times in total. In case the number of times of repetition of transfer request in the block transfer illustrated in FIG. 4 is set to 5, DMA transfer is carried out 500 times in total.

When the number of times of DMA transfer set for one time of transfer request in the newly inputted transfer request and the number of times of DMA transfer set for one time of transfer request stored in the second buffer 102 are equal to each other, the following takes place: at the number of times of transfer comparison circuit 111, the preset numbers of times of repetition in single transfer or block transfer are compared. Then a higher priority is set for a transfer request larger in the preset number of times of repetition and is outputted as the comparison result 232 to the determination circuit 113.

The determination circuit 113 is inputted with the comparison result 225 pertaining to priority level and the comparison result 232 pertaining to the number of times of DMA transfer and outputs a buffer selection signal 212 based thereon. The buffer selection signal 212 is outputted to the first buffer 101 and the second buffer 102.

The first buffer 101 and the second buffer 102 input and output transfer information between them and the transfer information input/output circuit 112. Based on the buffer selection signal 212, the first buffer 101 and the second buffer 102 take in the transfer information 221 inputted from the transfer information input/output circuit 112.

When the first buffer receives the buffer selection signal 212 indicating that the first buffer 101 has been selected, the first buffer 101 takes in the transfer information 221 from the transfer information input/output circuit 112, and outputs the information as transfer information 222 to the transfer information selection circuit 100. When the second buffer receives the buffer selection signal 212 indicating that the second buffer 102 has been selected, the second buffer 102 takes in the transfer information 221 from the transfer information input/output circuit 112, and outputs the information as transfer information 223 to the transfer information selection circuit 100.

Based on the buffer selection signal 201 inputted from the request number comparator 107 or the buffer selection signal 212 inputted from the priority control circuit 105, the transfer information selection circuit 100 selects the transfer information 222 inputted from the first buffer 101 or the transfer information 224 inputted from the second buffer 102 and outputs the selected transfer information 222 or 224 to the DMA transfer control circuit 114.

The DMA transfer control circuit 114, in accordance with the transfer request signal 215 inputted from the request number comparator 107 or the transfer request signal 214 inputted from the transfer information input/output circuit 112, outputs the transfer information 224 selected by the transfer information selection circuit 100 to the external peripheral I/O 123, peripheral I/O 122, RAM 125, and the like through the BCU control information 226.

Figure 5:
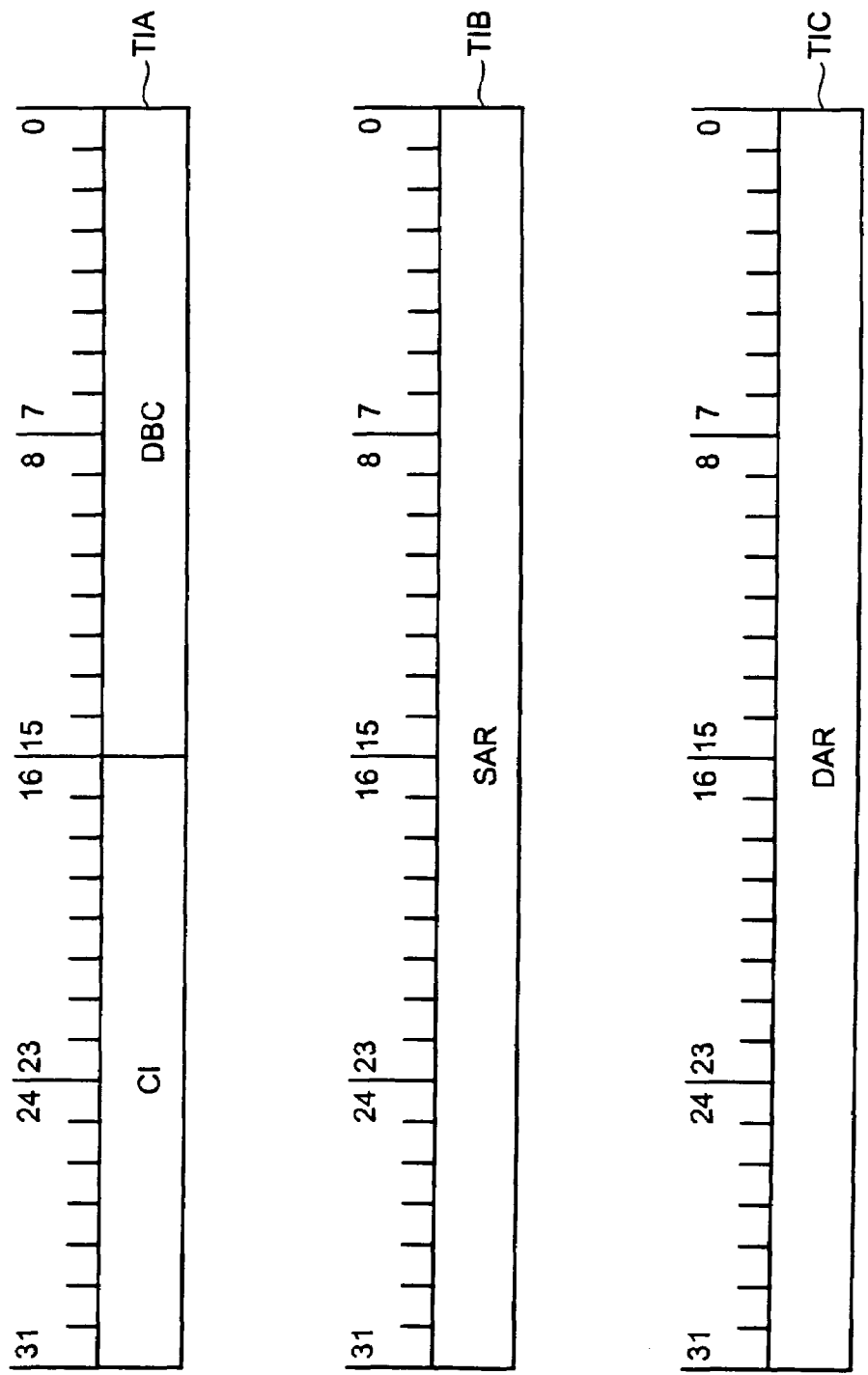
FIG. 5 is a drawing illustrating transfer information in a DMA device in the first exemplary embodiment of the invention.

FIG. 5 illustrates transfer information transferred in the DMA device in the first exemplary embodiment. The transfer information read by the transfer information input/output circuit 112 is composed as one piece of transfer information of transfer information TIA, TIB, TIC equivalent to 3 words. The transfer information TIA contains a number of times of transfer register DBC and control information CI. The transfer information TIB contains a source address register SAR. The transfer information TIC contains a destination address register DAR.

Figure 6:
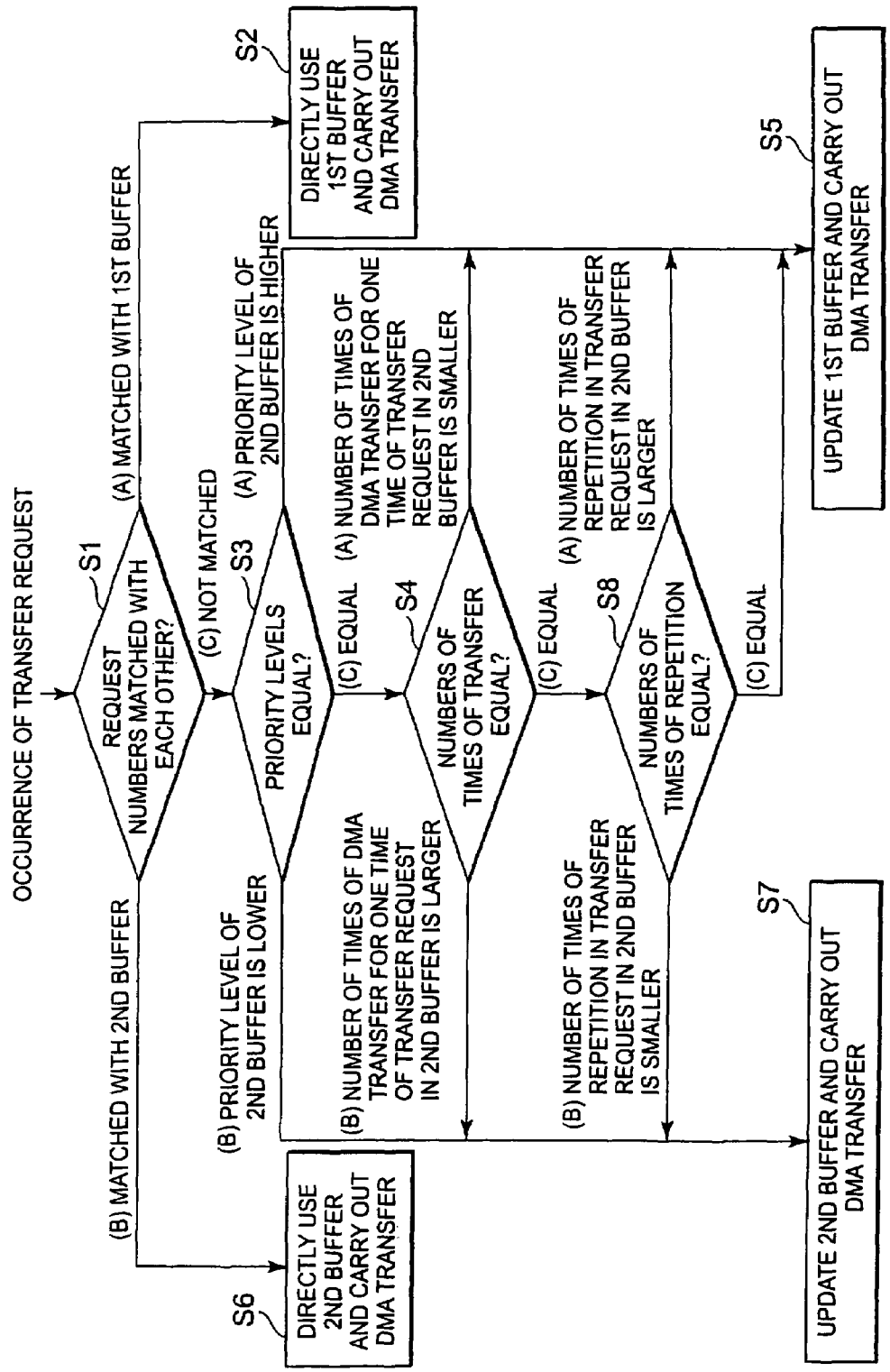
FIG. 6 is a flowchart illustrating the operation of a DMA device in the first exemplary embodiment of the invention.

Description will be given to an example of the operation of the thus configured DMA device in the first exemplary embodiment. FIG. 6 is a flowchart illustrating the operation of the DMA device in the first exemplary embodiment. When a transfer request occurs, the current request number 202 and the request numbers in the first buffer 101 and the second buffer 102 are compared with each other (S1).

When the current request number 202 and the request number in the first buffer 101 are matched with each other (A), the transfer information stored in the first buffer 101 is directly used to carry out DMA transfer (S2). Similarly, when the current request number 202 and the request number in the second buffer 102 are matched with each other (B), the transfer information in the second buffer 102 is directly used to carry out DMA transfer (S6).

When at step S1 the current request number 202 is not matched with the request number in the first buffer 101 or the second buffer 102 (C), the following processing is carried out: the priority level of the transfer request stored in the second buffer 102 and the priority level of the transfer request that has newly occurred are compared with each other (S3).

When at step S3 the priority level of the transfer request stored in the second buffer 102 is higher than the priority level of the new transfer request (A), the following processing is carried out: transfer information corresponding to the new transfer request is read and stored in the first buffer 101 and DMA transfer is carried out based on the transfer information stored in the first buffer 101 (S5).

When at step S3 the priority level of the transfer request stored in the second buffer 102 is lower than the priority level of the new transfer request (B), the following processing is carried out: transfer information corresponding to the new transfer request is read and stored in the second buffer 102 and DMA transfer is carried out based on the transfer information stored in the second buffer 102 (S7).

When at step S3 the priority level in the second buffer 102 and the priority level of the new transfer request are equal to each other (C), the following processing is carried out: the number of times of DMA transfer of the transfer request held in the second buffer 102 and the number of times of DMA transfer in the new transfer information are compared with each other (S4).

When at step S4 the number of times of DMA transfer for one time of transfer request in the transfer request stored in the second buffer 102 is smaller than the number of times of DMA transfer for one time of transfer request in the new transfer request (A), the following processing is carried out. Specifically, when the transfer request held in the second buffer 102 is the transfer request illustrated in FIG. 3 and the new transfer request is the transfer request illustrated in FIG. 4, it is determined that the priority of the transfer request held in the second buffer 102 is higher. Then the transfer information for the new transfer request is stored in the first buffer 101 and DMA transfer is carried out by this transfer information (S5).

When at step S4 the number of times of DMA transfer for one time of transfer request held in the second buffer 102 is larger than the number of times of DMA transfer for one time of transfer request in the new transfer request (B), the following processing is carried out. Specifically, when the transfer request held in the second buffer 102 is the transfer request illustrated in FIG. 4 and the new transfer request is the transfer request illustrated in FIG. 3, it is determined that the priority of the new transfer request is higher. Then the new transfer request is stored in the second buffer 102 and DMA transfer is carried out by the transfer information stored in the second buffer 101 (S7).

When the number of times of DMA transfer set for one time of transfer request in the newly inputted transfer request and the number of times of DMA transfer set for one time of transfer request stored in the second buffer 102 are equal to each other (C), the following processing is carried out: the preset numbers of times of repetition of single transfer or block transfer are compared with each other (S8). Then a higher priority is set for a transfer request larger in the preset number of times of repetition of transfer request transfer.

When at step S8 the number of times of repetition stored in the second buffer 102 is larger than the number of times of repetition of the new transfer request (A) or they are equal to each other (C), the second buffer 102 is not updated and the transfer information for the new transfer request is stored in the first buffer 101. Then DMA transfer is carried out using the transfer information stored in the first buffer 101 (S5).

When at step S8 the number of times of repetition stored in the second buffer 102 is smaller than the number of times of repetition of the new transfer request, the second buffer 102 is updated and transfer information for the new transfer request is stored in the second buffer 102. Then DMA transfer is carried out using the transfer information stored in the second buffer 102. When the numbers of times of DMA transfer for one time of transfer request are equal, as mentioned above, the numbers of times of repetition of transfer request are compared with each other. This makes it possible to hold transfer information involving a larger total number of operations of reading and writing back the transfer information in the second buffer 102.

When different request numbers are inputted to the DMA device 116, as mentioned above, the following processing is carried out: according to the determination of priority, the newly inputted transfer request and the transfer request stored in the second buffer 102 are compared with each other with respect to priority level and number of times of transfer information. When the result of the priority determination reveals that the priority in the second buffer 102 is higher or they are equal to each other, the first buffer 101 is updated. When the priority in the second buffer 102 is lower, the second buffer 102 is updated.

Description will be given to the DMA transfer operation based on a concrete example. In the following description, it is required to discriminate between cases where the previous transfer request and the transfer request of this time are identical with each other and cases where they are not. In the following description, therefore, two transfer requests, transfer request "1" and transfer request "2" will be taken as an example.

When transfer request "1" is inputted to the DMA device 116, the request number comparator 107 compares the current request number 202 of transfer request "1" with the request numbers stored in the first buffer 101 and the second buffer 102 (S1). Since both the first buffer 101 and the second buffer 102 are empty at this time, the comparison result is disagreement. Since the comparison result is disagreement, the request number comparator 107 outputs the transfer information read request 210 to the transfer information input/output circuit 112. It thereby causes the transfer information input/output circuit 112 to read transfer information for transfer request "1."

As the result of the transfer information read request 210 being inputted, the transfer information input/output circuit 112 reads transfer information TIA corresponding to the newly inputted transfer request from the RAM 125.

When the reading of transfer information TIA is completed, the priority control circuit 105 determines the priorities of transfer request "1" and the transfer request stored in the second buffer 102 (S3). This priority determination is carried out in two stages. First, the current priority level 203 of the inputted transfer request and the priority level stored in the second buffer 102 are compared with each other by the priority level comparison circuit 110. When their priority levels are equal to each other, the priority level comparison circuit 110 outputs the number of times of transfer comparison request 218 to the number of times of transfer comparison circuit 111.

When the number of times transfer comparison circuit 111 receives the number of times of transfer comparison request 218, the circuit 111 compares the number of times of transfer information 216 read through the transfer information input/output circuit 112 and the number of times of transfer information 217 stored in the second buffer 102. Then it determines the transfer request smaller in the number of times of DMA transfer for one time of transfer request to have a higher priority. As mentioned above, the priorities are determined in two stages. When the second buffer 102 is empty, the circuit 111 determines that the priority of the current priority level 203 is higher.

The priority control circuit 105 compares the priority of transfer request "1" with that in the second buffer 102 by the above determination method (S4). Since the second buffer 102 is empty, the priority control circuit 105 determines transfer request "1" is higher in priority than the transfer request stored in the second buffer and selects the second buffer 102 by the buffer selection signal 212. The priority control circuit 105 outputs the transfer information 221 and thereby places the already read transfer information TIA in the number of times of transfer register DBC and the control information CI in the second buffer 102.

Subsequently, transfer information TIB is read through the transfer information input/output circuit 112 and is placed in the source address register SAR in the second buffer 102 by the transfer information 221. Subsequently, transfer information TIC is read through the transfer information input/output circuit 112 and is placed in the destination address register DAR in the second buffer 102 by the transfer information 221.

The transfer information selection circuit 100 selects the transfer information 223 from the second buffer 102 based on the buffer selection signal 212 outputted from the determination circuit 113. The transfer information selection circuit 100 outputs transfer information stored in the selected second buffer 102 as the transfer information 224 to the DMA transfer control circuit 114. As a result, DMA transfer is carried out by the DMA transfer control circuit 114 based on the transfer information stored in the second buffer 102 (S5). In this case, the transfer information read to the second buffer 102 is not written back.

When transfer request "1" is inputted to the DMA device 116 again, the request number comparator 107 compares the request number of the inputted transfer request "1" with the request numbers stored in the first buffer 101 and the second buffer 102 (S1). In this case, the request number of the newly inputted transfer request "1" is the same as the request number previously stored in the second buffer 102. Therefore, the request number comparator 107 outputs the buffer selection signal 201 to the transfer information selection circuit 100 so as to select the second buffer 102. When the newly inputted transfer request "1" is already stored in the first buffer 101 or the second buffer 102, as mentioned above, transfer information stored in the first buffer 101 or the second buffer 102 is not updated.

The transfer information selection circuit 100 selects the transfer information 223 stored in the second buffer 102 by the buffer selection signal 201 inputted by the request number comparator 107, and outputs this transfer information 223 as the transfer information 224 to the DMA transfer control circuit 114. The DMA transfer control circuit 114 carries out DMA transfer for transfer request "1" based on the transfer information 224 inputted from the transfer information selection circuit 100 according to the transfer request signal 215 inputted from the request number comparator 107 (S6).

When transfer request "2" different in request number from transfer request "1" is inputted to the DMA device 116, the request number comparator 107 compares the following request numbers (S1): the current request number 202 of the inputted transfer request "2" with the request numbers stored in the first buffer 101 and the second buffer 102. In this case, the first buffer 101 is empty and the second buffer has the request number of transfer request "1" stored therein. Since the request number of the newly inputted transfer request "2" is not matched with the request number stored in the first buffer 101 or the second buffer 102, the request number comparator 107 outputs the transfer information read request 210 to the transfer information input/output circuit 112 to cause the transfer information input/output circuit 112 to read transfer information corresponding to transfer request "2."

The transfer information input/output circuit 112 reads transfer information TIA from the RAM 125 when the circuit 112 receives the transfer information read request 210 from the request number comparator 107. When the reading of transfer information TIA is completed, the priority control circuit 105 compares the priority of transfer request "1" in the second buffer 102 with the priority of the newly inputted transfer request "2" (S3). First, as mentioned above, the priority levels are compared and when the priority levels are identical, the priorities are determined by comparing the numbers of times of DMA transfer for one time of transfer request.

When the result of this priority comparison reveals that the priority in the second buffer 102 is higher, the determination circuit 113 outputs the buffer selection signal 212 to the first buffer 101, second buffer 102, and transfer information selection circuit 100 so as to select the first buffer 101. As a result, the first buffer 101 is selected. The transfer information input/output circuit 112 places the already read transfer information TIA as the transfer information 221 in the number of times of transfer register DBC and the control information CI in the first buffer 101.

Subsequently, the transfer information input/output circuit 112 reads transfer information TIB and places it in the source address register SAR in the first buffer 101 by the transfer information 221. The transfer information input/output circuit 112 reads transfer information TIC and places it in the destination address register DAR in the first buffer 101 by the transfer information 221.

The transfer information selection circuit 100 selects the transfer information 222 placed in the first buffer 101 according to the buffer selection signal 212 inputted from the determination circuit 113. The DMA transfer control circuit 114 carries out DMA transfer based on the transfer information in the first buffer 101, inputted as the transfer information 224, according to the transfer request signal 214 (S5). In this case, the transfer information stored in the first buffer 101 is written back.

When the results (S3, S4) of determination by the determination circuit 113 reveal that the priority in the second buffer 102 is lower, the second buffer 102 is selected according to the buffer selection signal 212. In the second buffer 102, the transfer information for transfer request "1" has been already placed. To save the already placed transfer information, the information in the second buffer 102 is once written back and the already read transfer information TIA is placed in the number of times of transfer register DBC and the control information CI in the second buffer 102 according to the transfer information 221.

Subsequently, the transfer information input/output circuit 112 reads transfer information TIB and places the information in the source address register SAR in the second buffer 102 by the transfer information 221. Subsequently, the transfer information input/output circuit 112 reads transfer information TIC and places the information in the destination address register DAR in the second buffer 102 by the transfer information 221. Based on the buffer selection signal 212 inputted from the priority control circuit 105, the transfer information selection circuit 100 selects the transfer information 223 stored in the second buffer 102, and outputs the information as the transfer information 224 to the DMA transfer control circuit 114. The DMA transfer control circuit 114 carries out DMA transfer based on the inputted transfer information 223 (S7).

When a transfer request different in request number occurs, as mentioned above, the priority of the transfer request that has newly occurred and the priority of the transfer request stored in the second buffer 102 are compared with each other. When the priority of the transfer request is higher, it is stored in the second buffer 102. Thus a transfer request having a higher priority is continuously placed in the second buffer 102.

As a result, the following can be implemented by setting a higher priority level for, for example, transfer information higher in transfer frequency: this transfer information is held in the second buffer 102 and it is possible to reduce overhead that is otherwise produced by writing-back when this transfer request occurs. This makes it possible to achieve the enhancement of DMA transfer processing speed.

Even when the priority levels are identical, the following is implemented by giving a higher priority to a transfer request smaller in the number of times of DMA transfer for one time of transfer request: transfer information for a transfer request smaller in the number of times of DMA transfer for one time of transfer request as in single transfer is held in the second buffer 102. As a result, writing-back operation can be reduced to reduce overhead.

In the first exemplary embodiment, only one second buffer 102 holding transfer information for a transfer request having a higher priority is provided. However, the invention is not limited to this and may be so configured that multiple second buffers 102 are provided. Though this increases the scale of circuitry, a large number of pieces of transfer information can be held and thus the operations of reading and writing back transfer information can be reduced.

Second Exemplary Embodiment

Figure 7:
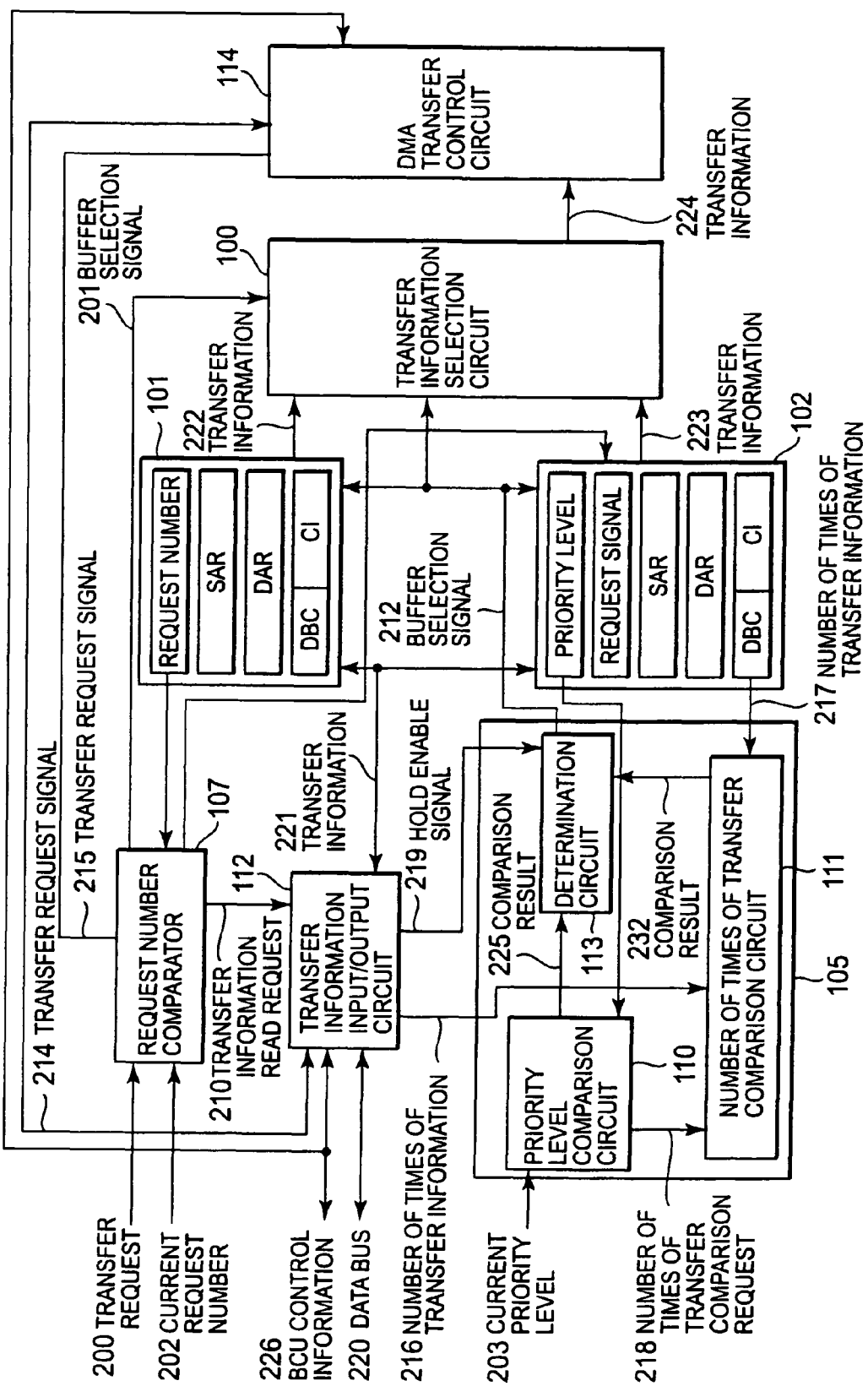
FIG. 7 is a block diagram illustrating an example of the configuration of a DMA device in a second exemplary embodiment of the invention.

FIG. 7 is a block diagram illustrating an example of the configuration of a DMA device in a second exemplary embodiment of the invention. The second exemplary embodiment is characterized in that the priority control circuit 105 in the first exemplary embodiment is replaced with a priority control circuit 105 with enable. The transfer information input/output circuit 112 in the first exemplary embodiment is modified so that it outputs a hold enable signal 219 to the priority control circuit 105 with enable. The hold enable signal 219 is a signal that prevents the use of the second buffer 102 and provides an instruction to continuously use the first buffer 101 regardless of determination by the determination circuit 113.

When it inputs transfer information, the transfer information input/output circuit 112 outputs HEN as the hold enable signal 219. This hold enable signal 219 is inputted to the determination circuit 113. When the inputted transfer information contains the hold enable signal 219, the determination circuit 113 outputs the buffer selection signal 212 so as to continuously select the first buffer 101 regardless of determination by the determination circuit 113.

Figure 8:
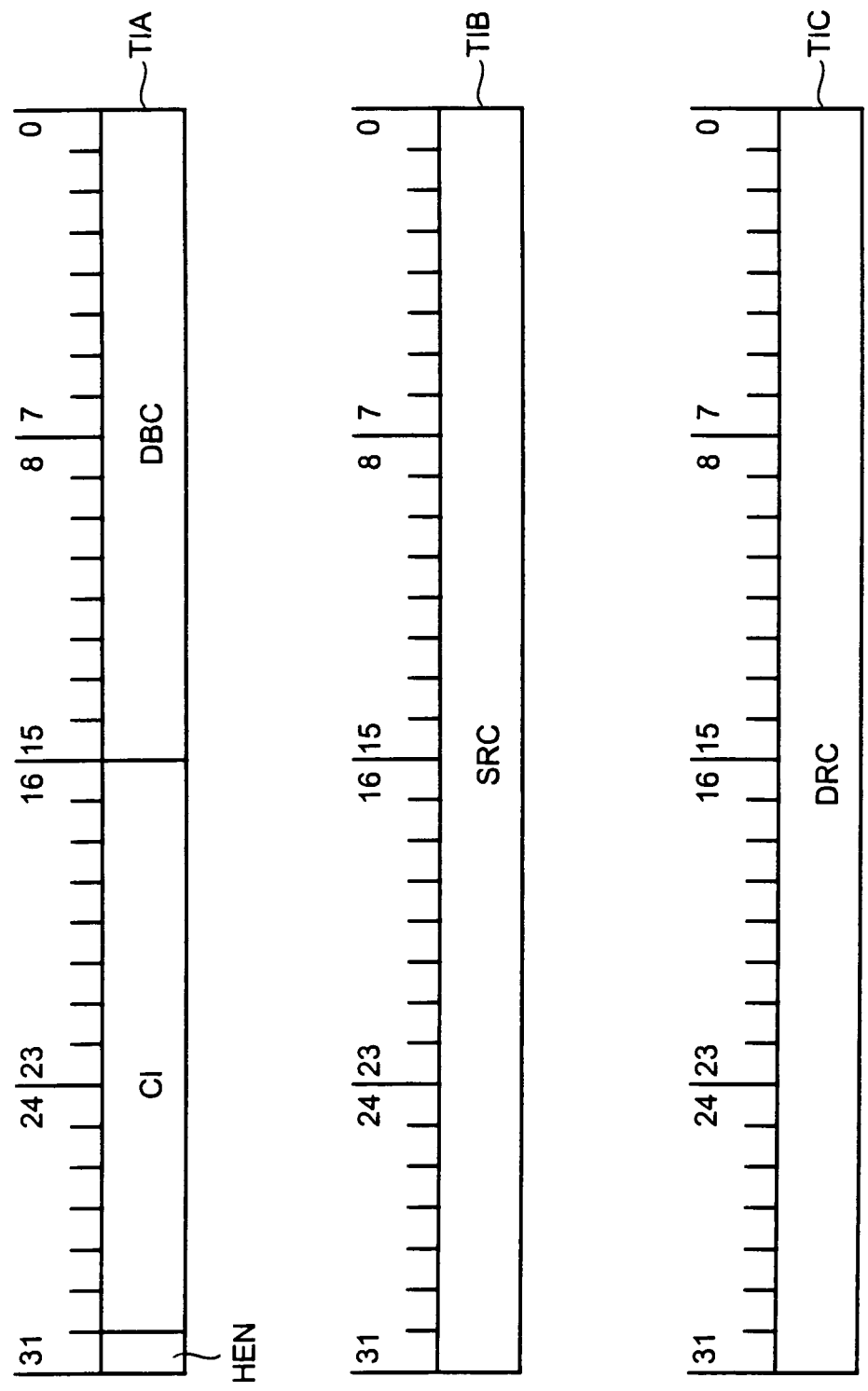
FIG. 8 is a drawing illustrating transfer information in a DMA device in the second exemplary embodiment of the invention.
Figure 9:
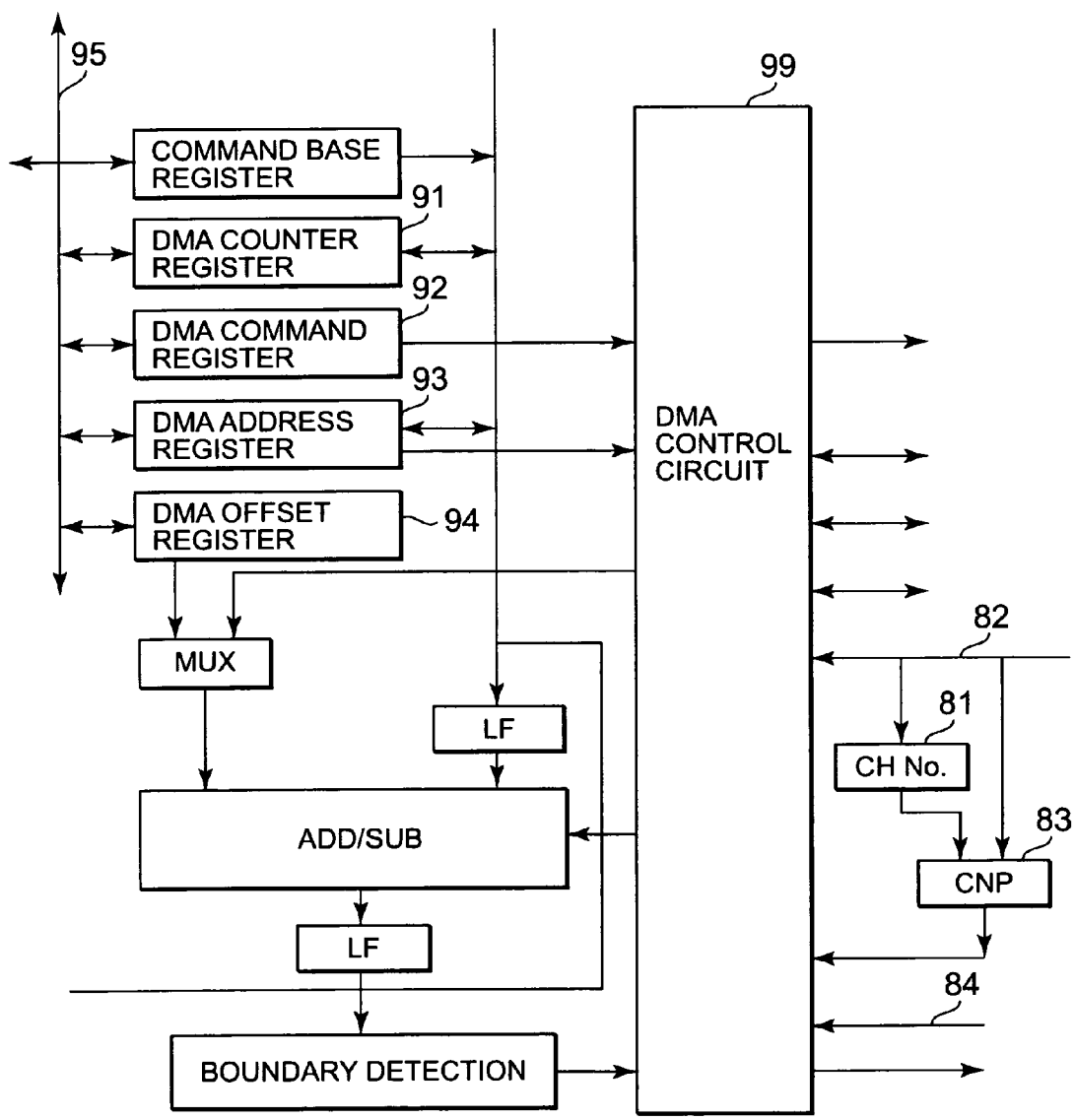
FIG. 9 is a block diagram illustrating the configuration of a device disclosed in Patent Document.
Figure 10:
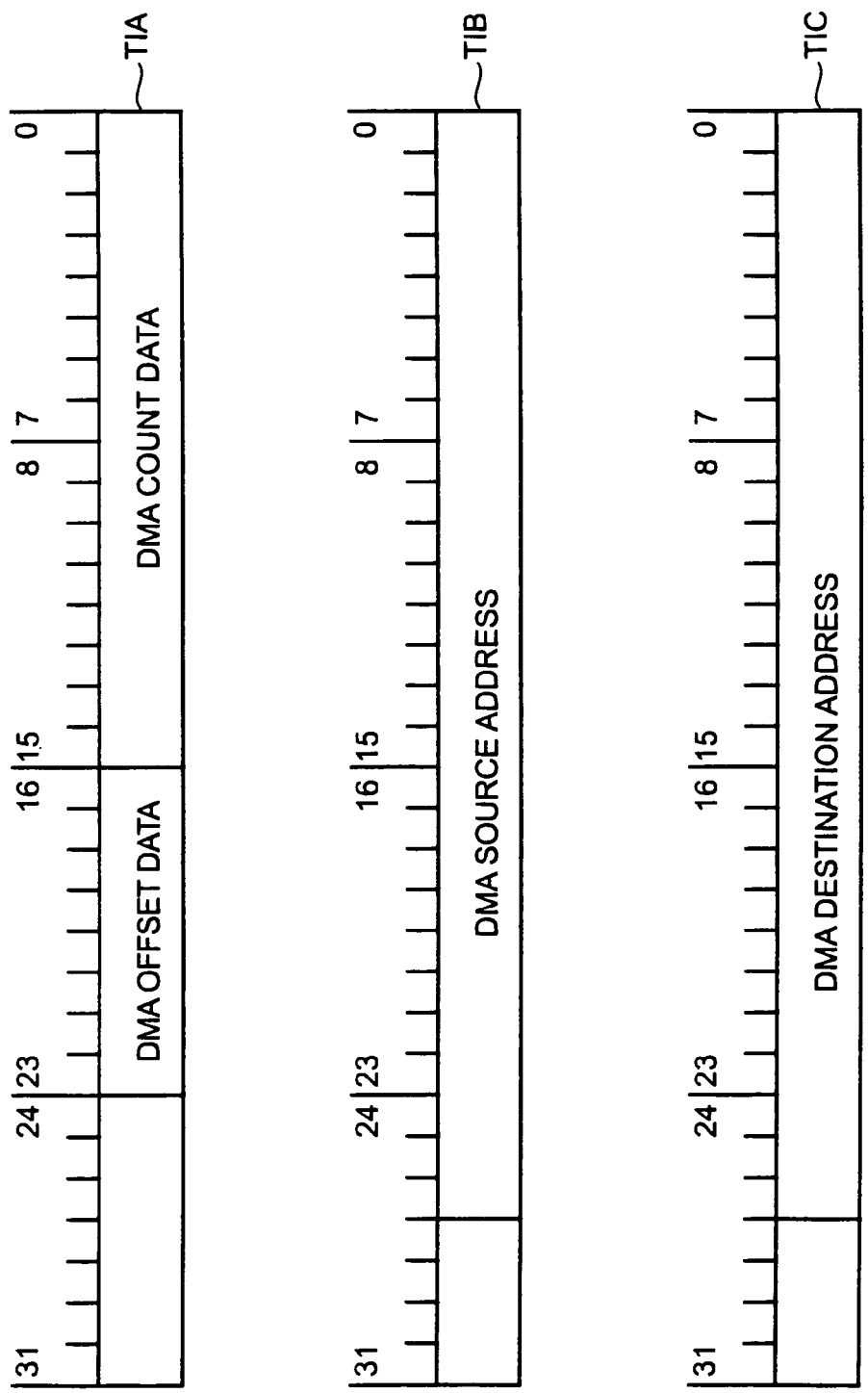
FIG. 10 illustrates a conceptual drawing of a memory map of a common microcomputer, illustrating multiple pieces of transfer information placed in RAM.
Figure 11:
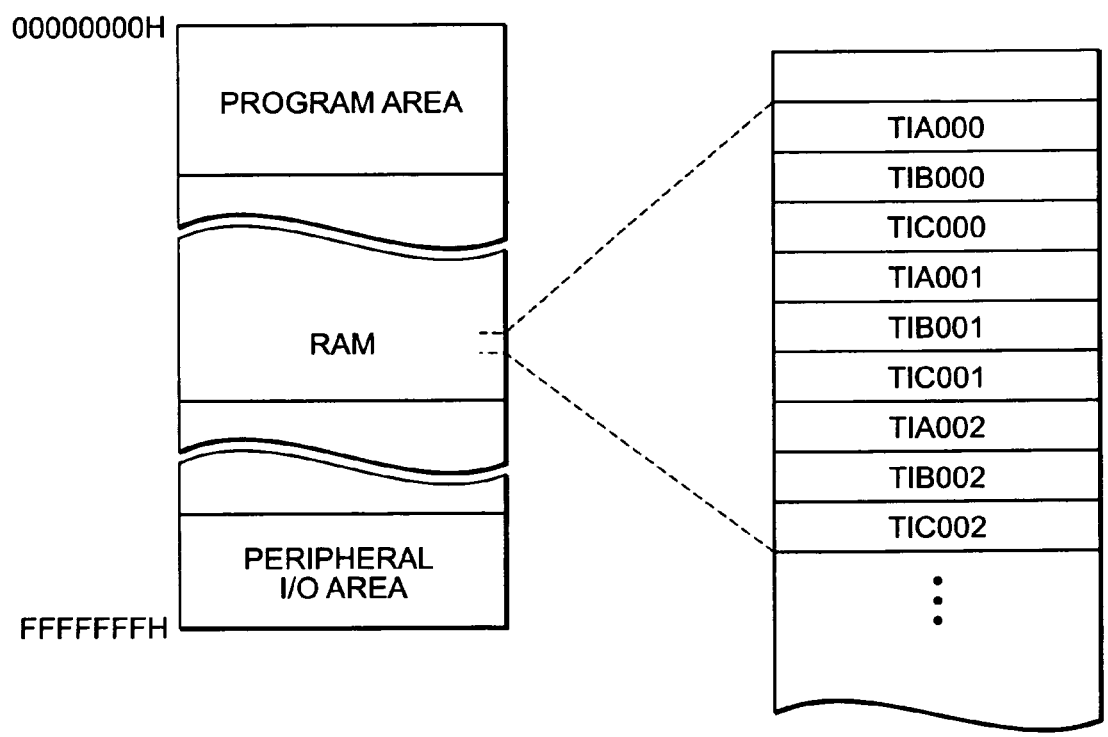
FIG. 11 is a drawing illustrating transfer information placed in RAM in Patent Document.
Figure 12:
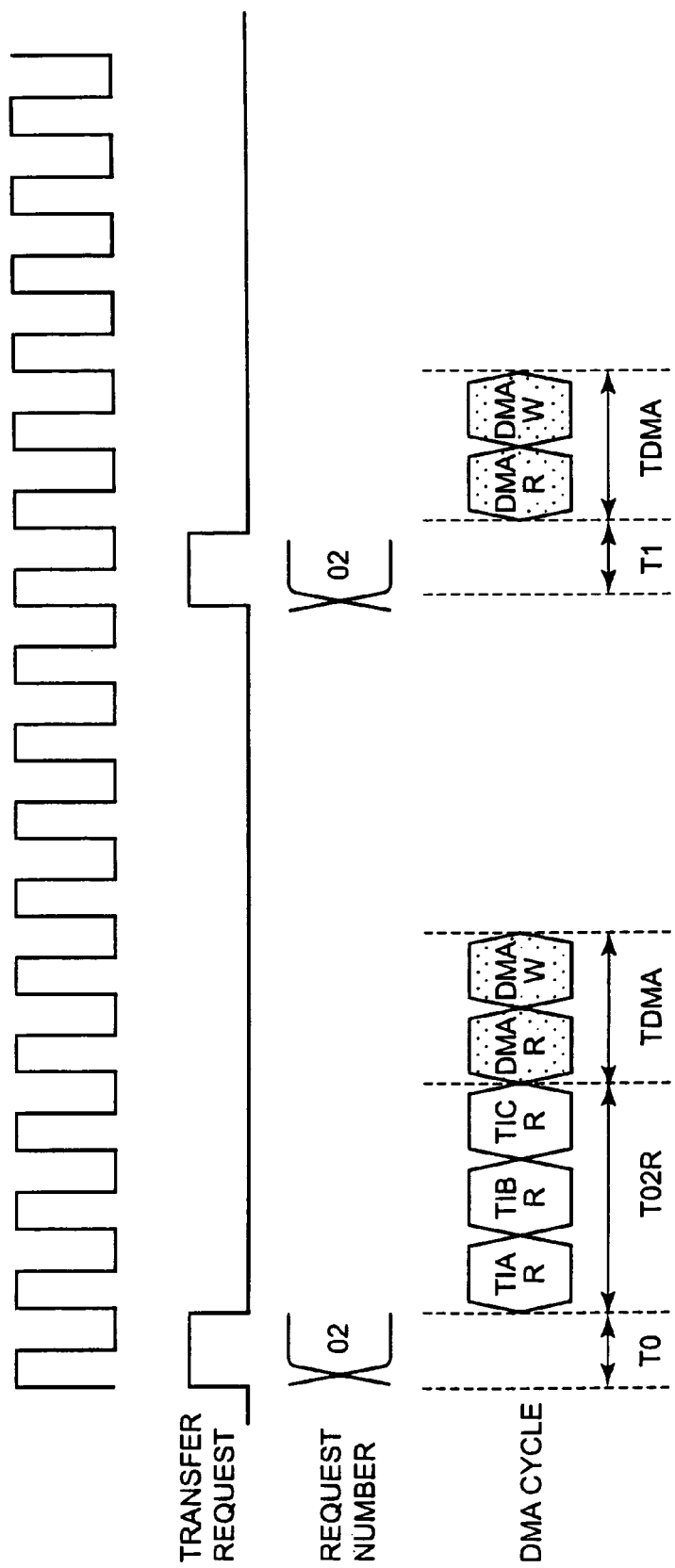
FIG. 12 illustrates a timing chart indicating a case where identical transfer requests are inputted in the device disclosed in Patent Document.
Figure 13:
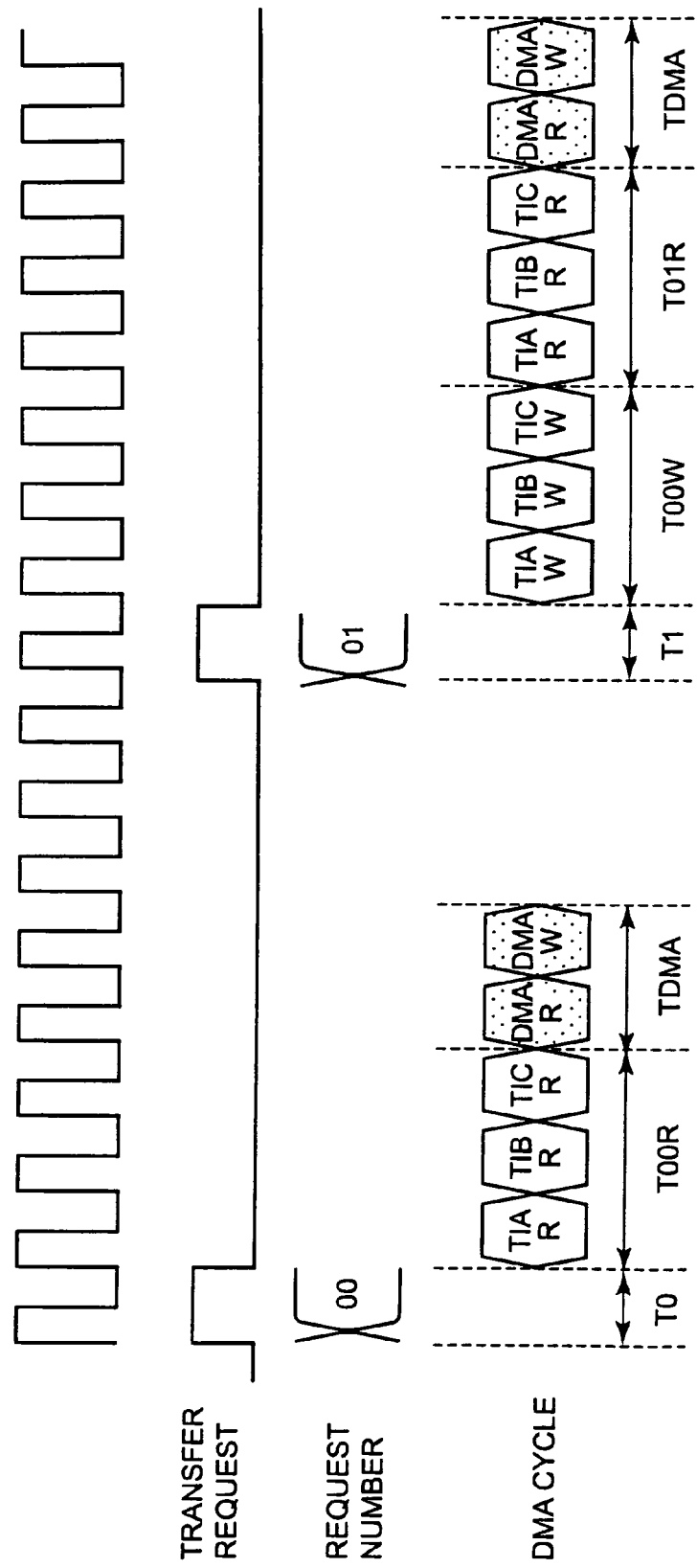
FIG. 13 illustrates a timing chart indicating a case where different transfer requests are inputted in the device disclosed in Patent Document.

As illustrated in FIG. 8, the hold enable signal 219 is provided as HEN as an enable bit in the control information CI in the transfer information. The position of the hold enable signal 219 is not limited to that in the transfer information illustrated in FIG. 8 and it can be provided in any position.

In case of block transfer (FIG. 4) in which the number of times of DMA transfer is large for one time of transfer request, the following takes place: the same operation as in the state in which single transfer (FIG. 3) is continuously held in the second buffer 102 is performed even though the first buffer 101 is used. In this case, if a higher priority is set for DMA transfer in which the operations of reading and writing back transfer information are smaller in number as in block transfer, then the following takes place: this transfer information is continuously held in the second buffer 102. Therefore, a transfer request involving a large number of the operations of reading and writing back transfer information as in single transfer is not held in the second buffer 102 and the second buffer 102 cannot be effectively used.

To cope with this, the following measure is taken in the DMA device in the second exemplary embodiment: when there is such a special transfer request that the number of times of DMA transfer is large (the intervals between requests are long) for one time of transfer request as in block transfer illustrated in FIG. 4, the following processing is carried out: the use of the second buffer 102 is prevented by the hold enable signal 219. This makes it possible for other transfer requests involving the frequent reading and writing-back of transfer information as in single transfer to continuously use the second buffer 102. Thus it is possible to effectively reduce overhead arising from the reading and writing-back of transfer information.

The invention is not limited to the above-mentioned exemplary embodiments and can be variously modified without departing from the subject matter of the invention, needless to add.

Further, it is noted that Applicant's intent is to encompass equivalents of all claim elements, even if amended later during prosecution.

What is claimed is:

1. A Direct Memory Access (DMA) device, comprising:
a first buffer which holds a first transfer information required for a first transfer request;
a second buffer which holds a second transfer information required for a second transfer request;
a transfer request comparison circuit which determines whether or not a current transfer request, which is newly inputted, matches with the first transfer request or the second transfer request;
a priority determination circuit that, in case where the transfer request comparison circuit determines that the current transfer request is not matched with the first transfer request or the second transfer request, updates the second transfer information to a transfer information for the current transfer request when a priority of the current transfer request is higher than a priority of the second transfer request, and updates the first transfer information to the transfer information for the current transfer request when the priority of the current transfer request is lower than the priority of the second transfer request; and
a DMA transfer control circuit which carries out a DMA transfer using the transfer information held in the first buffer or the second buffer updated by the priority determination circuit.

2. The DMA device according to claim 1,
wherein the priority of the current transfer request or the priority of the second transfer request are set based on a preset priority level or a number of times of DMA transfer set for one time of transfer request.

3. The DMA device according to claim 2,
wherein, in case where the priority level of the current transfer request and the priority level of the second transfer request are equal to each other, the priority determination circuit compares a number of times of the DMA transfer of the current transfer request with a number of times of the DMA transfer of the second transfer request, and
wherein the priority determination circuit updates the first transfer information to the transfer information for the current transfer request when the number of times of the DMA transfer of the current transfer request is larger than the number of times of the DMA transfer of the second transfer request and
wherein the priority determination circuit updates the second transfer information to the transfer information for the current transfer request when the number of times of the DMA transfer of the current transfer request is smaller than the number of times of the DMA transfer of the second transfer request.

4. The DMA device according to claim 1, further comprising:
a transfer information input and output circuit which obtains the transfer information corresponding to the current transfer request from a storage device and stores the transfer information in the first buffer or the second buffer,
wherein the transfer information input and output circuit disables updating of the second buffer based on the transfer information for the current transfer request.

5. The DMA device according to claim 4,
wherein the transfer information input and output circuit disables updating of the second buffer when the number of times of DMA transfer of the current transfer request is larger than a predetermined value.

6. The DMA device according to claim 1,
wherein the priority determination circuit writes the transfer information for the current transfer request to the second buffer when there is not any transfer information held in the second buffer in an initial state.

7. A DMA transfer method using a DMA device equipped with a first buffer holding a first transfer information required for a first transfer request and a second buffer holding a second transfer information required for a second transfer request, the method comprising:
determining whether or not a current transfer request, which is a newly inputted transfer request, matches with the first transfer request or the second transfer request;
in case where the current transfer request does not match with the first transfer request or the second transfer request,
updating the second transfer information to the transfer information for the current transfer request when a priority of the current transfer request is higher than a priority of the second transfer request;

updating the first transfer information to the transfer information for the current transfer request when the priority of the current transfer request is lower than the priority of the second transfer request; and carrying out a DMA transfer using the transfer information held in the updated first buffer or second buffer.

8. The DMA transfer method according to claim 7, wherein the priority of the current transfer request or the priority of the second transfer request are set based on a preset priority level or the number of times of DMA transfer set for one time of transfer request.

9. The DMA transfer method according to claim 8, further comprising:

when the priority level of the current transfer request and the priority level of the second transfer request are equal to each other, comparing a number of times of the DMA transfer of the current transfer request with a number of times of the DMA transfer of the second transfer request;

updating the first transfer information to the transfer information for the current transfer request when the number of times of the DMA transfer of the current transfer request is larger than the number of times of the DMA transfer of the second transfer request; and updating the second transfer information to the transfer information for the current transfer request when the number of times of the DMA transfer of the current transfer request is smaller than the number of times of the DMA transfer of the second transfer request.

10. The DMA transfer according to claim 8, further comprising:

disabling updating of the second buffer regardless of the priority and the DMA transfer is carried out using the first buffer, when the number of times of the DMA transfer is larger than a predetermined value.

11. The DMA transfer method according to claim 7, further comprising:

writing the transfer information for the current transfer request as the second transfer information to the second buffer when the second transfer information is not held in the second buffer in the initial state.

12. A DMA transfer method, comprising:

updating a transfer information stored in a first buffer to a transfer information for a newly inputted transfer request when a priority level of a newly inputted transfer request is higher than the priority level of the transfer request held in the first buffer; and updating a transfer information stored in a second buffer to the transfer information for the newly inputted transfer request when the priority level of the newly inputted transfer request is lower than the priority level of the transfer request held in the first buffer.

13. The DMA transfer method as claimed in claim 12, further comprising:

performing a DMA transfer using the transfer information in the first buffer, without updating the transfer information in the first buffer, when the newly inputted transfer request is coincident with the transfer information in the first buffer; and performing a DMA transfer using the transfer information in the second buffer, without updating the transfer information in the second buffer, when the newly inputted transfer request is coincident with the transfer information in the second buffer.

14. The DMA transfer method as claimed in claim 12, further comprising:

in case where the priority level of the newly inputted transfer request is same as the priority level of the transfer request held in the first buffer, updating the transfer information stored in the first buffer to the transfer information for the newly inputted transfer request when a number of times of a DMA transfer to the newly inputted transfer request is higher than a number of times of a DMA transfer to the transfer request held in the first buffer; and updating the transfer information stored in the second buffer to the transfer information for the newly inputted transfer request when the number of times of the DMA transfer to the newly inputted transfer request is smaller than the number of times of the DMA transfer to the transfer request held in the first buffer.

15. The DMA transfer method as claimed in claim 14, further comprising:

in case where the number of times of the newly inputted transfer request is same as the number of times of the transfer request held in the first buffer, updating the transfer information stored in the first buffer to the transfer information for the newly inputted transfer request when a number of times of a repetition to the newly inputted transfer request is higher than a number of times of a repetition to the transfer request held in the first buffer; and updating the transfer information stored in the second buffer to the transfer information for the newly inputted transfer request when the number of times of the repetition to the newly inputted transfer request is smaller than the number of times of the repetition to the transfer request held in the first buffer.

16. The DMA transfer method as claimed in claim 12, further comprising:

disabling updating of the first buffer when the number of times of the DMA transfer to the newly inputted transfer request is larger than a predetermined value.

* * * * *